United States Patent [19]

Deller et al.

[11] Patent Number: 5,145,735
[45] Date of Patent: Sep. 8, 1992

[54] LAYERED FABRIC

[75] Inventors: Paul N. Deller, North Eltham; Peter R. Terry, Berwick, both of Australia

[73] Assignee: Rheem Australia Limited, Rydalmere, Australia

[21] Appl. No.: 246,353

[22] Filed: Sep. 19, 1988

Related U.S. Application Data

[63] Continuation-in-part of Ser. No. 897,397, Jul. 7, 1986, abandoned.

[30] Foreign Application Priority Data

Nov. 5, 1984 [AU] Australia .............................. PG7983

[51] Int. Cl.$^5$ .............................................. B32B 7/00
[52] U.S. Cl. .................................... 428/246; 156/191; 156/244.11; 428/252; 428/284; 428/286.
[58] Field of Search .................. 428/34.7, 36.2, 36.91, 428/252, 476.1, 483, 500, 516, 284, 287, 286, 252, 246; 156/191, 244.11, 244.22, 244.23, 244.24

[56] References Cited

U.S. PATENT DOCUMENTS 4,087,577 5/1978 Hendrickson ...................... 428/247

FOREIGN PATENT DOCUMENTS 930100 7/1983 United Kingdom .

Primary Examiner—James J. Bell
Attorney, Agent, or Firm—Flehr, Hohbach, Test, Albritton & Herbert

[57] ABSTRACT

The present invention relates to a layered fabric which is a laminate formed from a substrate layer of woven filamentary plastics material and having a first exterior layer of thermoplastic polymer. A second exterior layer of thermoplastic polymer is secured to the substrate, opposite the first exterior layer by means of a hot melt coat positioned in between the substrate and the second exterior layer. The hot melt coat is a thermoplastic polymer. The thermoplastic polymers include polypropylene and polyethylene. Low density polyethylene is preferred. The filamentary material can be a polyolefin, a polyester or nylon but tapes of high density polyethylene are preferred. A method of forming the layered fabric and liquid containment vessels, such as hoses, fabricated from the fabric are also disclosed.

14 Claims, 2 Drawing Sheets

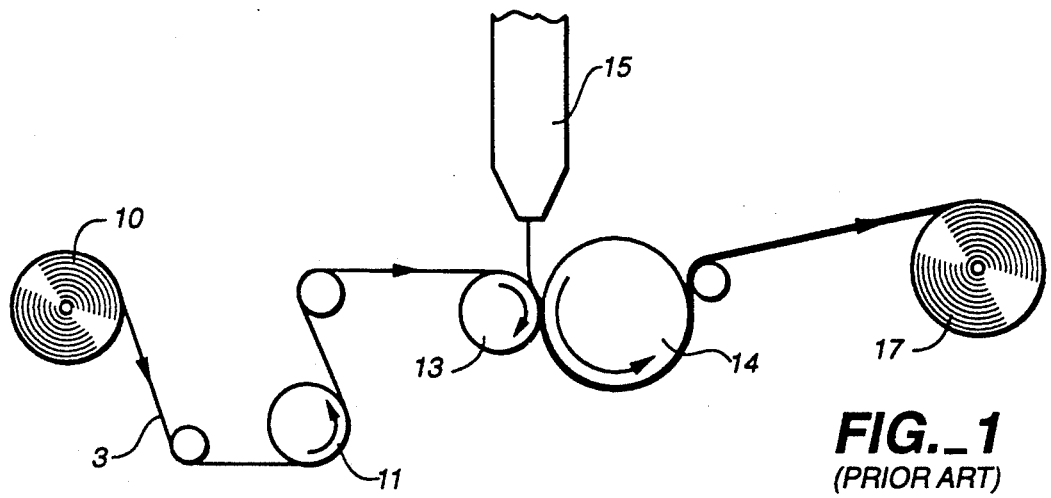
FIG._1
(PRIOR ART)
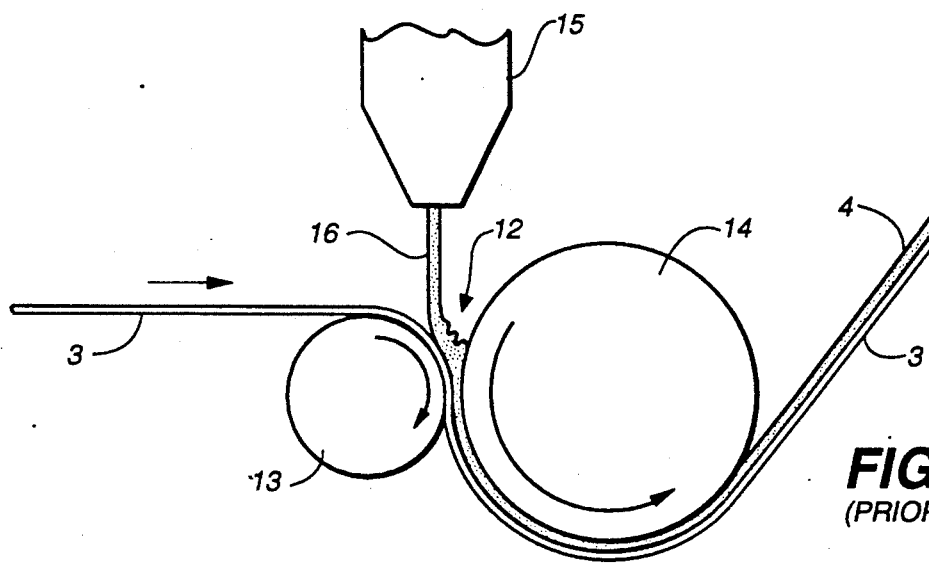
FIG._2
(PRIOR ART)
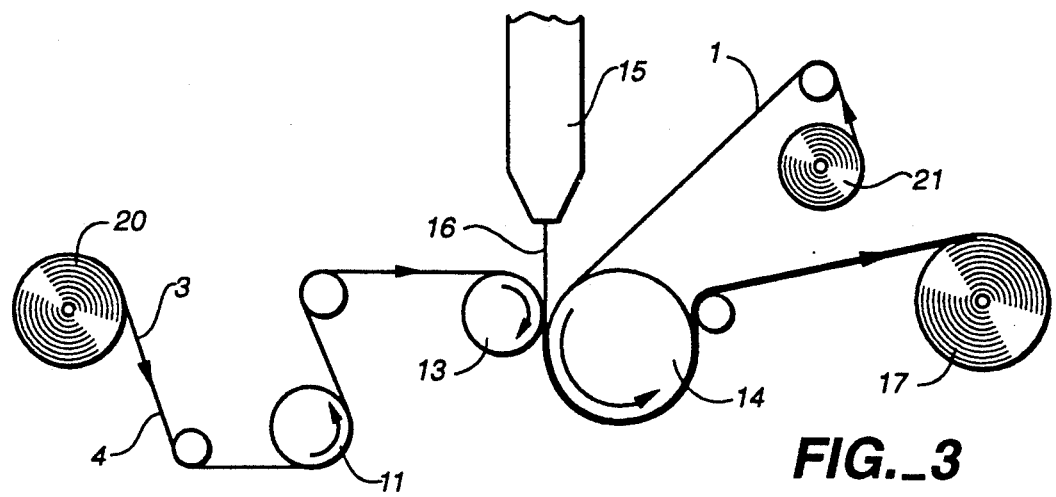
FIG._3

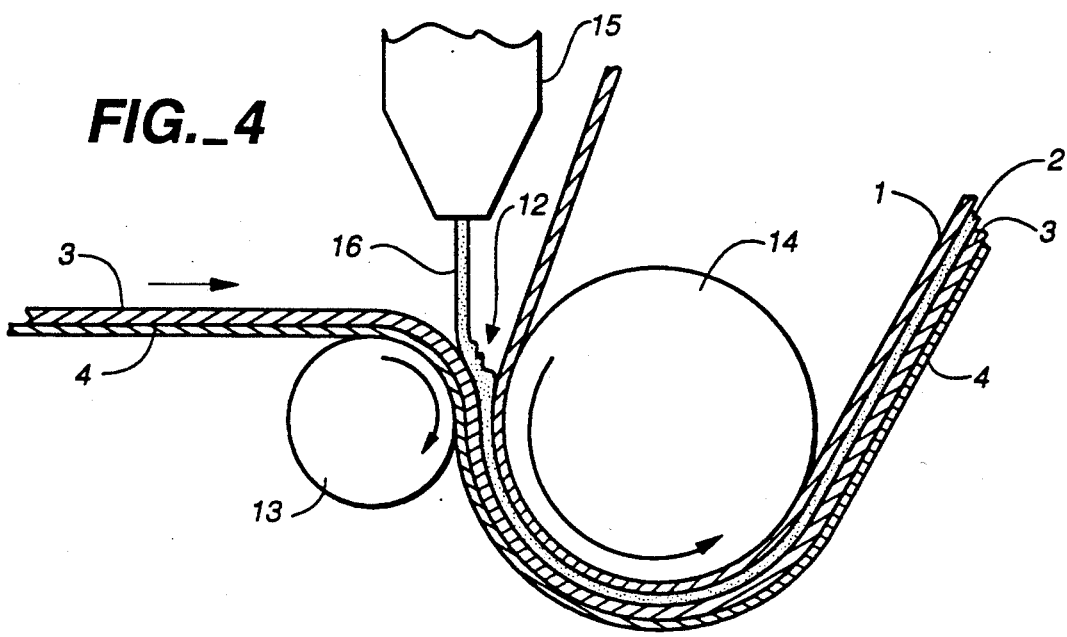
FIG._4
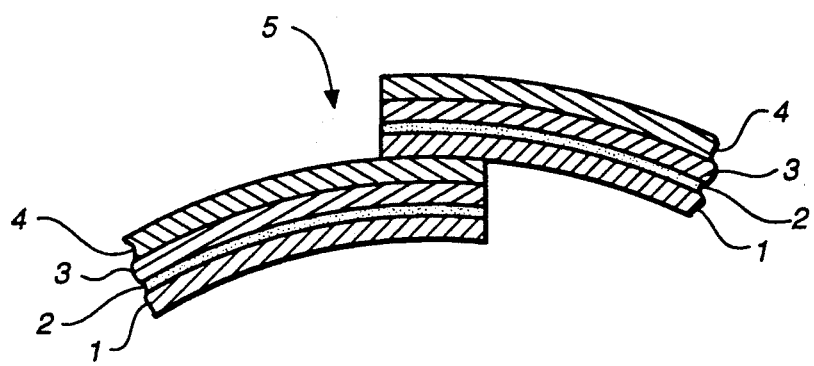
FIG._5
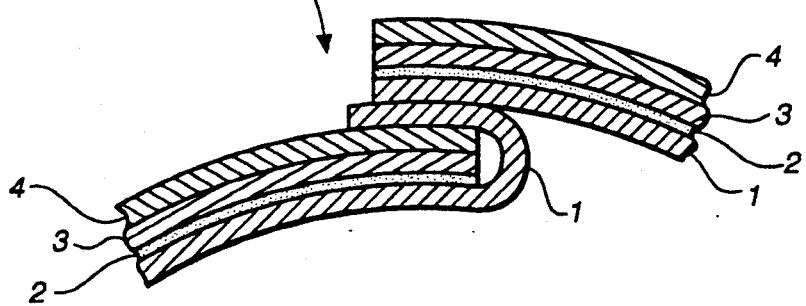
FIG._6
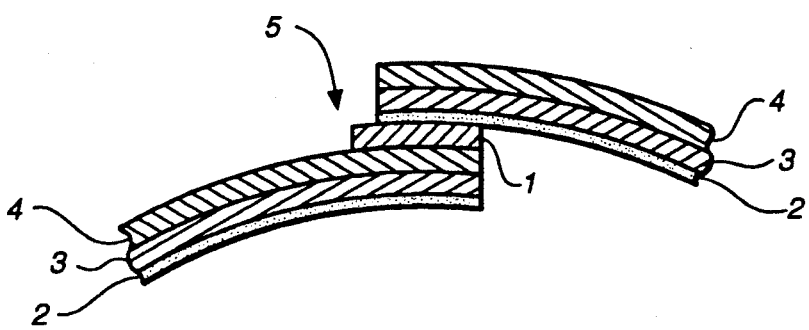
FIG._7

LAYERED FABRIC

One known type of hose is formed from a single layer of polyolefin film and suffers from the disadvantage that the hose of nominally 250 mm diameter is only able to withstand an internal pressure of approximately 20 kPa. In addition the hose has very poor tear, abrasion, puncture and weather resistance.

Another known type of hose is made from woven polyester fabric which is coated with an extrusion melt coat layer of polyvinyl chloride on each side of the woven polyester. Although this type of hose has a satisfactory resistance to the rigours of use, it is very heavy to handle. It is also extremely expensive due to the high material costs as well as the slow production rate obtained when welding longitudinal seams.

It is the object of the present invention to provide a layered fabric from which hoses, and other liquid containment vessels can be fabricated which will substantially overcome, or ameliorate, the abovementioned disadvantages.

According to the first aspect of the present invention there is disclosed a layered fabric comprising a laminate formed from a substrate layer of filamentary plastics material and having a first exterior layer of thermoplastic polymer secured to one surface of said substrate, and a second exterior layer of thermoplastic polymer secured to the other surface of said substrate by a hot melt coat interposed between said other surface and said second exterior layer, said hot melt coat being a thermoplastic polymer.

According to a second aspect of the present invention there is disclosed a method of forming a layered fabric comprising the steps of laminating a substrate layer of filamentary plastics material having a first exterior layer of thermoplastic material comprising one surface thereof, to a second exterior layer of thermoplastic polymer by forming a hot melt coat interposed between the other surface of said substrate and said second exterior layer, said hot melt coat being a thermoplastic polymer.

Liquid containment vessels including hoses formed from the abovementioned layer fabric are also disclosed.

An embodiment of the present invention will now be described with reference to the, drawings in which:

FIG. 1 is a schematic illustration of the roller and die apparatus used in the hot melt extrusion process, FIG. 2 is an enlarged portion of FIG. 1 showing the detail of the extrusion coating, FIG. 3 is a view similar to FIG. 1 but illustrating the apparatus used to form the laminate of the present invention, FIG. 4 is an enlarged view of a portion of the apparatus of FIG. 3, FIG. 5 is a transverse cross-sectional view of the longitudinal seam of a hose or liquid containment vessel made from the fabric of the preferred embodiment, FIG. 6 is a view similar to FIG. 5 but showing an alternative seam configuration, and FIG. 7 is a view similar to FIGS. 5 and 6 but showing a third seam arrangement.

FIGS. 1 and 2 illustrate the prior art process of melt coat extrusion. A supply roll 10 of a substrate is passed around a pre-heating roller 11 and thence into the nip 12 formed between a pressure roller 13 and a chilling roller 14. Located directly above the nip 12 is an extrusion die 15 having a longitudinally extending slot shaped nozzle (not illustrated) from which issues a stream 16 of melted thermoplastic material which is extruded from the die 15. The coated substrate passes to a take up roller 17.

FIG. 2 illustrates the detail of the nip 12 from which it will be seen that the stream 16 of molten thermoplastic material is squeezed between one (upper) side of the substrate 3 and the chilling roller 14 thereby coating that upper side of the substrate 3 with an exterior layer 4.

FIGS. 3 and 4 show the fabricating steps required to produce the layered fabric of the preferred embodiment. A supply roll 20 of the coated substrate 3/4 can be purchased from an outside supplier, or can constitute the result of the material taken up on the take up roll 17 of FIG. 1. However, the material is arranged so that the first exterior layer 4 is located on the underside of the material which enters the nip 12. The pressure roller 13, chilling roller 14 and die 15 are substantially as before. A second exterior layer 1 is provided by a second supply roll 21 which contains a supply of previously extruded thermoplastics film or sheet and the resulting laminated fabric is taken up by a take up roll 17 as before.

FIG. 4 illustrates the detail of the hot melt coating procedure. It will be apparent that the material of the hot melt coat 2 constitutes the extruded melted thermoplastic stream 16 as before which is now applied between the upper surface of the substrate 3 and one surface of the exterior layer 1. The hot melt coat material adheres the substrate layer 3 to the exterior layer 1 thereby forming a laminated material. It is thought that if there are any pin holes or other small openings present in either the coated substrate 3/4, or the exterior layer 1, then these small openings are sealed by the material of the hot melt coat 2 during the lamination process.

The substrate 3 can be formed from any filaments of plastics material, suitable materials being polyolefins, polyesters and nylon. The preferred form of material is woven tapes of high density polyethylene. The substrate layer 3 can include woven or non-woven constructions and other synthetic or natural fibres can be included as part of, or all, of the filamentary layer.

The exterior layers 1,3 are formed from thermoplastic polymeric material such as polypropylene or polyethylene. The preferred material is low density polyethylene (LDPE). Where this material is to be used in the first exterior layer 4, the material preferably contains additives capable of imparting resistance to abrasion and/or ultraviolet radiation.

EXAMPLE 1

A laminated layered fabric having four layers as illustrated in FIG. 4 was manufactured in accordance with the following specification. The first (exterior) layer 1 was separately extruded film comprising a blend of LDPE and linear LDPE having a nominal thickness of 50 micrometers. The second layer 2 was a melt extruded adhesive layer of LDPE having a nominal thickness of from 40 to 50 micrometers.

The third layer or substrate 3 was the filamentary layer formed from stretched tapes of high density polyethylene (HDPE) woven as warp and weft. This layer has a nominal mass per unit area of 160 grams per square meter.

The fourth layer (or second exterior layer) 4 was melt extruded LDPE with UV and abrasion resistive additives and having a nominal thickness of 40 to 50 micrometers.

The layered fabric thus manufactured, was formed into a very long hose of 250 mm diameter and wall thickness approximately 0.3 mm by overlapping opposing edges of the layered fabric by approximately 45 mm and then using heat and pressure to form a seam, by the hot air welding method. At least equally satisfactory seams can also be formed by ultrasonically welding or by adhesive bonding methods. The resultant hose was tested by pumping water through it at a steady head of 60 kPa with occasional over pressure transients as high as 300 kPa. The hose was substantially leak tight and remained so for several hours despite being run over several times whilst still filled with water by a heavy loader type of vehicle fitted with tractor type tires. The performance of this hose is regarded as remarkable in view of its low mass of only 180 grams per linear meter. FIG. 5 illustrates the seam of the hose in question.

FIG. 6 illustrates a further seam arrangement in which the layer 1 overhangs the remainder of the fabric to enable a seam to be formed in which the layer 1 forms an overlap type seam. Other forms of seam such as spiral seams, or fin type seams will be apparent to those skilled in the art.

FIG. 7 shows an alternative arrangement in which the laminate of the preferred embodiment is formed only in the weld area. This may be regarded as providing the layer 1 only in the area of the seam. An alternative arrangement is to provide an S-shaped configuration (not illustrated) which doubles or mirrors the U-shaped configuration of FIG. 6. Under this arrangement, both the layers 1 are extended, one in each of two opposite directions to sandwich the internal external overlap of the seam region, in addition to both layers 1 passing through the middle of the seam itself.

The foregoing describes only one embodiment of the present invention and modifications, obvious to those skilled in the art, can be made thereto without departing from the scope of the present invention.

We claim:

1. A layer fabric comprising a substrate layer formed by coating a filamentary plastics material with molten thermoplastic polymer which, after solidification, forms said substrate layer of thermoplastic polymer, said substrate layer comprising one exterior surface of the fabric when finished; and said substrate layer being subsequently laminated to a separately extruded second layer of solidified thermoplastic polymer, said second layer forming the other exterior surface of the finished fabric, said substrate layer and said second layer being secured together by solidification of a melt extruded thermoplastic polymer interposed between said substrate layer and said second layer.

2. A fabric as claimed in claim 1 wherein said thermoplastic polymers are selected from the group consisting of polypropylene and polyethylene.

3. A fabric as claimed in claim 2 wherein said hot melt coat is low density polyethylene.

4. A fabric as claimed in claim 2 wherein said first exterior layer is formed from low density polyethylene.

5. A fabric as claimed in claim 3 wherein said second exterior layer is formed from low density polyethylene.

6. A fabric as claimed in claim 1,2,3,4 or 5 wherein said filamentary plastics material is selected from the group consisting of polyolefins, polyesters and nylon.

7. A fabric as claimed in claim 6 wherein said layer of filamentary plastics material comprises high density polyethylene tapes woven as warp and weft.

8. A method of forming a layered fabric comprising the steps of laminating a substrate layer of filamentary plastics material having a first exterior layer of thermoplastic material comprising one surface thereof, to a second exterior previously formed layer of thermoplastic polymer by forming a extruded hot melt coat interposed between the other surface of said substrate and said second exterior layer, said hot melt coat being a thermoplastic polymer.

9. A method as claimed in claim 8 wherein said thermoplastic polymers are selected from the group consisting of polypropylene and polyethylene.

10. A method as claimed in claim 9 wherein said hot melt coat is low density polythylene.

11. A method as claimed in claim 9 wherein said first exterior layer is formed from low density polyethylene.

12. A method as claimed in claim 10 wherein said second exterior layer is formed from low density polyethylene.

13. A method as claimed in claim 8,9,10,11 or 12 wherein said filamentary plastics material is selected from the group consisting of polyolefins, polyesters and nylon.

14. A method as claimed in claim 13 wherein said filamentary plastics material comprises high density polyethylene tapes woven as warp and weft.

* * * * *